United States Patent [19]
Clarke et al.

[11] Patent Number: 5,997,985
[45] Date of Patent: Dec. 7, 1999

[54] METHOD OF FORMING ACOUSTIC ATTENUATION CHAMBERS USING LASER PROCESSING OF MULTI-LAYERED POLYMER FILMS

[75] Inventors: James A. Clarke, Greenlawn, N.Y.; Robert K. Kunze, Jr., Derby, Kans.

[73] Assignee: Northrop Grumman Corporation, Los Angeles, Calif.

[21] Appl. No.: 09/150,579

[22] Filed: Sep. 10, 1998

[51] Int. Cl.⁶ ...................................................... B32B 3/12
[52] U.S. Cl. ............................ 428/116; 428/73; 428/118; 244/1 W; 244/119; 181/286; 181/292; 181/294
[58] Field of Search .............................. 428/73, 116, 118; 181/33, 286, 292, 294; 161/112; 264/156; 244/1 W, 119

[56] References Cited

U.S. PATENT DOCUMENTS

| | | |
|---|---|---|
| 3,435,186 | 3/1969 | Roshon, Jr. et al. .................... 219/121 |
| 3,770,560 | 11/1973 | Elder et al. ............................. 161/112 |
| 3,948,346 | 4/1976 | Schindler ................................. 181/33 |
| 4,091,892 | 5/1978 | Hehmann ................................ 181/286 |
| 4,161,231 | 7/1979 | Wilkinson ............................... 181/294 |
| 4,235,303 | 11/1980 | Dhoore et al. .......................... 181/214 |
| 4,257,998 | 3/1981 | Diepenbrock et al. ................. 264/156 |
| 4,265,955 | 5/1981 | Harp et al. .............................. 428/116 |
| 4,318,453 | 3/1982 | Rose et al. .............................. 181/292 |
| 4,327,816 | 5/1982 | Bennett ................................... 181/292 |
| 4,421,201 | 12/1983 | Nelsen et al. ........................... 181/214 |
| 4,421,811 | 12/1983 | Rose et al. .............................. 428/116 |
| 4,475,624 | 10/1984 | Bourland et al. ....................... 181/292 |
| 4,743,123 | 5/1988 | Legters et al. .......................... 383/103 |
| 4,816,097 | 3/1989 | Williams et al. ....................... 156/247 |
| 4,850,093 | 7/1989 | Parente ..................................... 29/428 |
| 4,915,981 | 4/1990 | Traskos et al. ........................ 427/53.1 |
| 4,926,963 | 5/1990 | Snyder ................................... 181/290 |
| 5,059,256 | 10/1991 | Kanapenas et al. ....................... 148/9 |
| 5,169,678 | 12/1992 | Cole et al. .............................. 427/555 |
| 5,227,013 | 7/1993 | Kumar .................................... 156/644 |
| 5,487,852 | 1/1996 | Ludden et al. ......................... 264/400 |
| 5,532,440 | 7/1996 | Fujiwara ................................. 181/289 |
| 5,593,606 | 1/1997 | Owen et al. ....................... 219/121.71 |
| 5,626,771 | 5/1997 | Davis et al. ............................. 216/13 |
| 5,653,836 | 8/1997 | Mnich et al. ............................ 156/98 |

Primary Examiner—Deborah Jones
Assistant Examiner—Jason Resnick
Attorney, Agent, or Firm—Terry J. Anderson; Karl J. Hoch, Jr.

[57] ABSTRACT

In accordance with the present invention, there is provided a method of forming an acoustic attenuation chambers within a honeycomb core. The honeycomb core have a plurality of honeycomb cells having interconnected side walls. A plurality of septum layers are spaced from one another within the honeycomb cells to define acoustic attenuation chambers between the septum layers and the side walls of the honeycomb cells. Each of the septum layers have an associated ablating wavelength and is transparent to the ablating wavelengths of the other septum layers. A laser beam having a laser wavelength is directed towards the septum layers. The laser beam is selectively absorbed by a septum layer which has an associated ablating wavelength equal to the laser wavelength to ablate apertures therethrough without ablating other septum layers.

14 Claims, 2 Drawing Sheets

METHOD OF FORMING ACOUSTIC ATTENUATION CHAMBERS USING LASER PROCESSING OF MULTI-LAYERED POLYMER FILMS

FIELD OF THE INVENTION

The present invention relates generally to methods of forming acoustic attenuation layers, and more particularly to a method of forming an acoustic attenuation chambers using multi-layered polymer films which are sensitized to varying laser ablation wavelengths.

BACKGROUND OF THE INVENTION

Acoustic attenuation has become an ever increasing focus of consideration. For example, regulatory restrictions demand the increased efficiency of methods of mitigating turbo aircraft engine noise. Mechanical structures for mitigating sound, such as those which integrate honeycomb core materials, are generally known in the art. Various prior art methods of altering such honeycomb core materials for enhanced acoustic attenuation performance have included combinations of perforated sheets and honeycomb core materials. For example, multiple perforated sheets may be sandwiched between multiple sheets of a honeycomb core material for reducing sound.

In addition, laser ablation has become a widely recognized tool for processing polymer materials. With the addition of a dopant into bulk polymer materials, it is possible to sensitize most known polymers for ultraviolet and infrared ablation at selected laser wavelengths. Important features of dopant-induced ablation are the reduction of threshold energy fluences required for ablation, and the enhancement of the etching rate by factors higher than ten.

It is therefore evident that there exists a need in the art for a method integrating polymer films with existing honeycomb core materials to achieve an acoustic attenuation structure having enhanced acoustic attenuation features.

SUMMARY OF THE INVENTION

In accordance with the present invention, there is provided a method of forming an acoustic attenuation chambers within a honeycomb core. The honeycomb core have a plurality of honeycomb cells having interconnected side walls. A plurality of septum layers are spaced from one another within the honeycomb cells to define acoustic attenuation chambers between the septum layers and the side walls of the honeycomb cells. Each of the septum layers have an associated ablating wavelength and is transparent to the ablating wavelengths of the other septum layers. A laser beam having a laser wavelength is directed towards the septum layers. The laser beam is selectively absorbed by a septum layer which has an associated ablating wavelength equal to the laser wavelength to ablate apertures therethrough without ablating other septum layers. Preferably the acoustic apertures are formed in all of septum layers. The acoustic apertures may be formed to have varying aperture diameters and configurations associated with particular septum layers. Additionally, outer acoustic chambers may be formed within the honeycomb cells by attaching a porous face sheet to the honeycomb core.

Preferably a polymeric material is used to form the septum layers which may be poly(methyl methacrylate), polystyrene, polyimide and nitrocellulose, for example. In addition, the polymeric material may be doped with a chromophore to alter the optical characteristics of the polymeric material at a predetermined laser wavelength. Preferably, the laser used may be operated at ultraviolet or infrared wavelengths.

In another embodiment of the present invention, there is provided an acoustic attenuating structure which is constructed in accordance with the above described method.

As such, based on the foregoing, the present invention mitigates the inefficiencies and limitations associated with prior art acoustic attenuation structures and methods of constructing the same. Importantly, the present method of fabricating the above-described acoustic attenuation structure facilitates laser drilling of one of the septum layers to have specifically sized acoustic apertures of a specific quantity and in a specific configuration without affecting an adjacent one of the septum layers. The adjacent one of the septum layers may be subsequently laser drilled to have differently sized acoustic apertures of a different quantity and configuration. Thus, when sound waves pass through one septum layer such waves may be forced to deviate course prior to continuing to pass through the adjacent septum layer. In this respect, it is contemplated that an increase in acoustic attenuation may be realized over those prior art acoustic attenuation structures in which uniformly sized configured septum layers are employed.

In addition, the present method facilitates insitu laser formed micro-sized acoustic apertures in close proximity to each other to result in microporous septum layers. By lazing the acoustic apertures while the septum layers are disposed within the honeycomb core, acoustic design options are increased with regard to the thickness and material selection of the septum layers and the sizing and degree of the acoustic apertures. This is due the nature of high porosity septum layers being highly susceptible to tearing and lacking in structural integrity. Such tearing is mitigated as the septum layers are disposed within the honeycomb core prior to the formation of the acoustic apertures.

Furthermore, the method of the present invention facilitates retrofitting existing acoustic honeycomb structures for mitigating sound. For example, existing honeycomb core based acoustic liners for turbo aircraft engines may be retrofitted with the above described laser ablated septum layers of the present invention.

Accordingly, the present invention represents a significant advance in the art.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
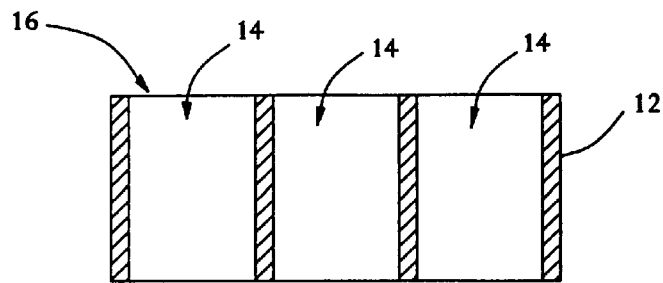
FIG. 1 is a symbolic cross sectional view of a section of honeycomb core which is used to form the acoustic attenuation structure and used in conjunction with the method of fabricating the same of the present invention.

Referring now to the drawings wherein the showings are for purposes of illustrating a preferred embodiment of the present invention only, and not for purposes of limiting the same, FIGS. 1–6 illustrate a method of the present invention for constructing an acoustic attenuation structure.

In accordance with the present invention, there is provided a method of forming an acoustic attenuating structure 10. A honeycomb core 12 is initially provided which has a plurality of honeycomb cells 14 as illustrated in FIG. 1. The honeycomb core 12 has generally planer opposing sides 16. The honeycomb cells 14 are defined by side walls 18 which traverse the opposing sides 16 of the honeycomb core 12 and facilitate fluidic passage from one side of the honeycomb core 12 to the other. It is contemplated that the size, configuration and material selection of the honeycomb core 12 and the honeycomb cells 14 therein are chosen from those of well known to one of ordinary skill in the art depending upon the particular application.

Figure 2:
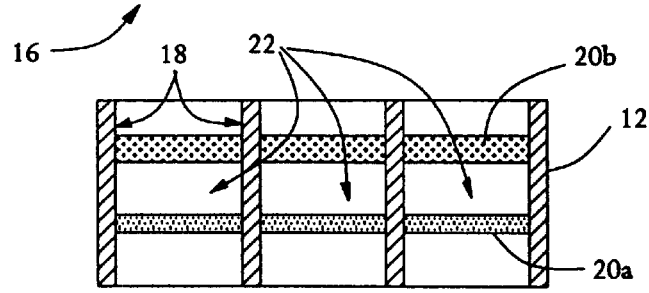
FIG. 2 is the honeycomb core of FIG. 1 with polymer septum layers disposed therein.

Referring now to FIG. 2, acoustic attenuation chambers 22 are formed within the honeycomb cells 14 by providing at least two septum layers 20a, 20b are formed within the honeycomb cells 14 spaced apart from one another within the honeycomb cells 14. The septum layers 20a, 20b are disposed within the honeycomb cells 14 so as span the side walls of each of the respective honeycomb cells 14. The septum layers 20a, 20b form thin barriers or membranes across and within the honeycomb cells 14. As such, a respective one of the acoustic attenuation chambers 22 is defined by the side walls 18 of a given one of the honeycomb cells 14 and the adjacent septum layers 20a, 20b thereat.

A thin polymer material is used to form the septum layers 20a, 20b. The polymer material may initially take the form of a sheet, example. The sheet of polymer material may be spread upon one of the sides 16 of the honeycomb core 12. A source of pressure may be applied to the sheet of polymer material so as to urge or press the polymer material into the honeycomb core and, more particularly, into the honeycomb cells 14. Although not shown, a foam mat or fluid, for example, may be used to press the sheet into place. Thus, the honeycomb core 12 itself may be used to cut the sheet of polymer material as it is urged into individual honeycomb cells 14. As one of ordinary skill in the art will appreciate, the polymer material must be sufficiently ductile to facilitate such cutting. Other methods of disposing the septum layers 20a, 20b within the honeycomb core 12 are contemplated to be chosen from those well known to one of ordinary skill in the art and may include, for example, chemical deposition or optical curing techniques.

The septum layers 20a, 20b are formed of respective polymeric materials based upon their optical characteristics. In particular, the polymeric material is selected to have an optical absorbency to an ablating wavelength. The optical absorbency to an ablating wavelength of a respective one of the septum layers 20a, 20b is different than at least one other optical absorbency of another respective one of the septum layers 20a, 20b. Moreover, while a particular one of the septum layers 20a, 20b may be susceptible to (i.e., absorptive at) a laser ablating wavelength, an adjacent one of the septum layers 20a, 20b may be selectively formed of a polymer material which is transmissive at such wavelength. In this respect, the polymeric material may be poly(methyl methacrylate), polystyrene, polyimide and nitrocellulose, for example. Other materials which are well known to those of ordinary skill in the art may be equally suitable. In addition, the polymeric material may be selectively doped with a chromophore to alter the optical characteristic, absorption/transmission, of the polymeric material at a predetermined laser wavelength. Suitable chromophores may be chosen from those well known to one of ordinary skill in the art and may include, for example, benzoin, anthracene, rhodamine, stilbene and diphenyltriazene. In this respect, as an illustration, it has been observed that where a poly(methyl methacrylate)(i.e., PMMA) polymer material is doped with a benzoin chromophore, the resultant material exhibits absorption at a laser beam irradiation wavelength of approximately 248 nm to facilitate laser ablation. Similarly, it has been observed that where a polystyrene polymer material is doped with a anthracene chromophore, the resultant material exhibits transmissivity at a laser beam irradiation wavelength of approximately 351 nm. It is contemplated that appropriate doping techniques may be chosen from those which are well known to one of ordinary skill in the art.

Figure 3:
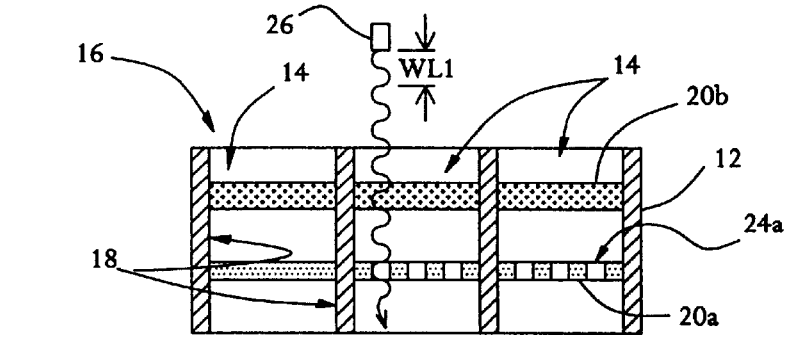
FIG. 3 is the honeycomb core of FIG. 2 depicting laser ablation of one the septum layers.
Figure 4:
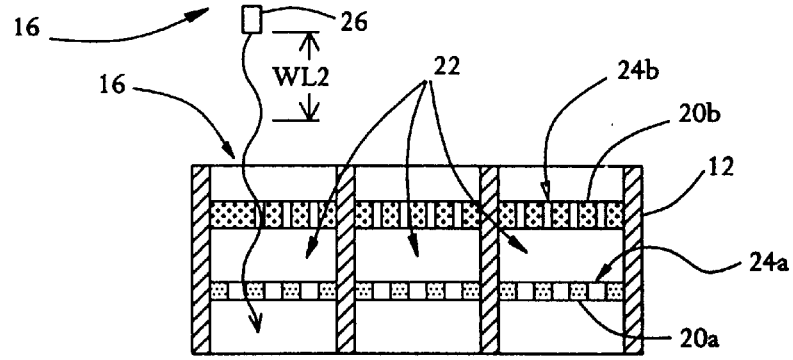
FIG. 4 is the honeycomb core of FIG. 3 depicting laser ablation of the other one of the septum layers.

Referring now to FIGS. 3 and 4, acoustic apertures 24a, 24b are formed through a respective one of the septum layers 20a, 20b by ablating a respective one of the septum layers 20a, 20b with a laser beam at the ablating wavelength of the respective one of the septum layers 20a, 20b. Importantly, such ablation is effectuated without ablating at least one other respective one of the septum layers 20a, 20b. As symbolically illustrated in FIG. 3, a laser beam emitted from a laser 26 is directed towards the septum layers 20a, 20b at a wavelength of WL1. Septum layer 20a has an ablating wavelength of WL1 and is transmissive at a wavelength of WL2. Septum layer 20b has an ablating wavelength of WL2 and is transmissive at a wavelength of WL1. As one of ordinary skill in the art will appreciate, the laser used may be operated at ultraviolet or infrared wavelengths as it is contemplated that the polymer materials are chosen to be absorptive/transmissive within such wavelengths. While the laser beam drills or ablates the acoustic apertures 24a in septum layer 20a, septum layer 20b is unchanged. Similarly, referring now to FIG. 4, a laser beam operated at a wavelength of WL2 is used to form acoustic apertures 24b in septum layer 20b without affecting septum layer 20a.

Although only two septum layers 20a, 20b are depicted additional septum layers may be used. Preferably acoustic apertures are formed in all of septum layers disposed in the honeycomb cells 14. As shown, the acoustic apertures 24a, 24b are formed to have a different aperture diameters and configurations. Because of the degree of precision associated with laser ablation techniques, the acoustic apertures 24a, 24b may have aperture diameters which are less than six millimeters to a few thousandth of a millimeter, for example. In addition, the apertures 24a, 24b may be formed to be in close proximity to each other.

Thus, the septum layers 20a, 20b may be formed to be microporous in nature. The degree of porosity may be adjusted so at to vary percent open area associated with the septum layers 20a, 20b and may be, for example, on the order of greater than one percent. It is contemplated that a sheet of similar polymer material having an equivalent porosity would be extremely difficult to dispose within the honeycomb core 12 as such porous material is highly susceptible to tearing and lacking in structural integrity. By the above laser ablation technique, however, it is possible to perforate or laser drill the septum layers 20a, 20b insitu, i.e., while in place within the honeycomb cells 14. Moreover, because of the particular polymer material selection criteria, in terms of optical absorption and transmission characteristics, the present method facilitates insitu laser drilling of one of the septum layers 20a, 20b to have specifically sized acoustic apertures 24a, 24b, in a specific quantity and in a specific configuration without affecting an adjacent one of the septum layers 20a, 20b. The adjacent one of the septum layers 20a, 20b may be subsequently laser drilled to have differently sized acoustic apertures of a different quantity and configuration, as is illustrated in FIG. 3. Having laser drilled the septum layers 20a, 20b, it is contemplated that an interconnected fluidic network is formed within each of the honeycomb cells 14.

As one of ordinary skill in the art will appreciate, there are a variety of parameters which influence the degree of laser ablation. Particular combinations of these parameters are contemplated to be chosen from those well known to those of ordinary skill in the art. For example, the laser beam may be adjusted with regard to wavelength, fluence range, focus point, repetition rate, pulse duration, state of polarization, homogeneity of beam cross section, operating atmosphere and method of exposure.

Figure 5:
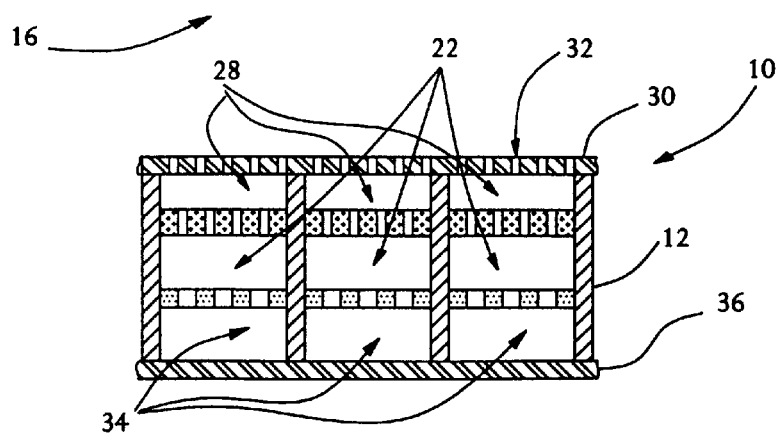
FIG. 5 is the honeycomb core of FIG. 4 with face and back plates.

Additionally, outer acoustic chambers 28 may be formed within the honeycomb cells 14 by attaching a face sheet 30 to the honeycomb core 12, as shown in FIG. 5. The face sheet 30 may be porous in nature and have a plurality of perforations 32. Likewise, inner acoustic chambers 34 may be formed within the honeycomb cells 14 by attaching a back sheet 36 on the opposing side of the honeycomb core from that to which the face sheet 30 is disposed. The back sheet 36 may take the form as a solid sheet of material. It is contemplated that the back sheet 36 may aid in the structural support of the honeycomb cells 14 during processing. In this regard, the back sheet 36 may be attached to the honey comb cells 14 prior to the insertion of the septum layers 20a, 20b.

Figure 6:
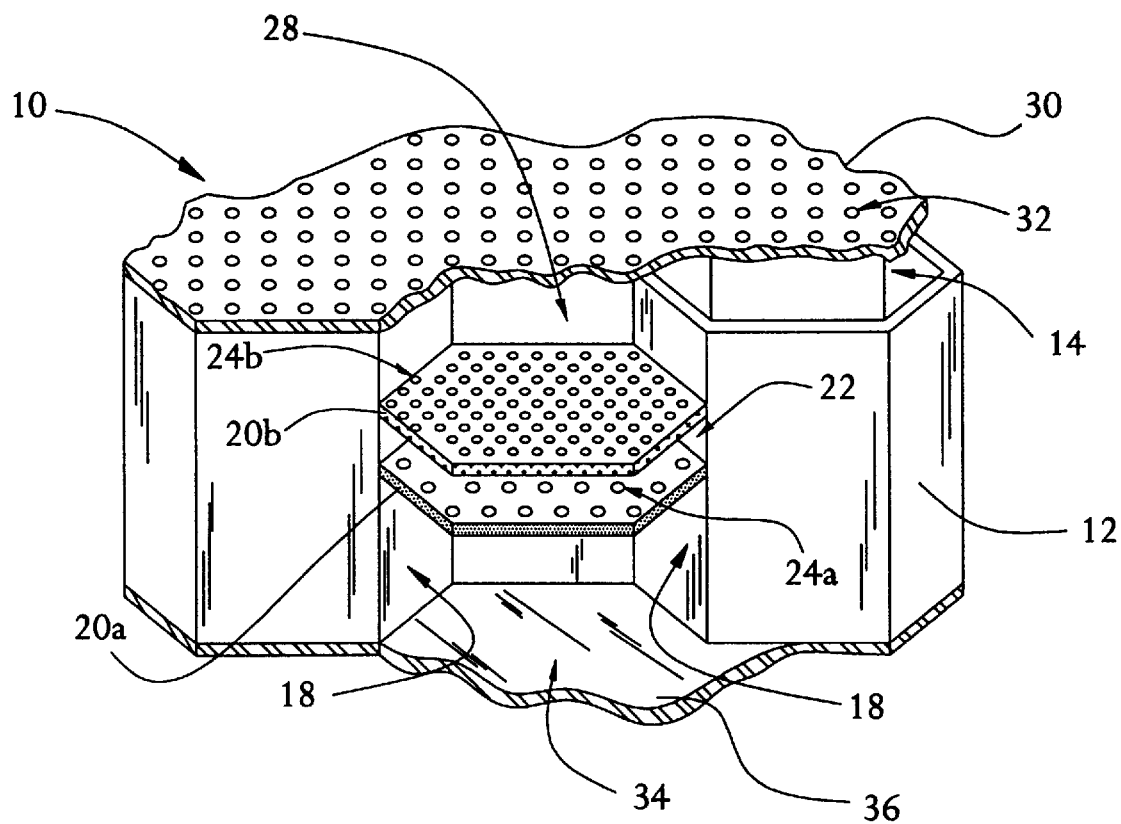
FIG. 6 is a symbolic perspective view of a portion of an acoustic attenuating structure shown the interior of a representative honeycomb cell.

Referring now to the FIG. 6 there is depicted a symbolic perspective view of a portion of an acoustic attenuating structure showing the interior of a representative honeycomb cell. In operation, it is contemplated that sound waves impinge upon the face sheet 30 and permeate into the acoustic structure 10 via the perforations 32 formed in the face sheet 30. The sound waves enter the outer acoustic chambers 28 within the honeycomb cells 14. It is contemplated that a portion of these sound waves are attenuated as the energy associated with them is partially absorbed as the waves contact the side walls 18 of the honeycomb cells 14, the interior most surface of the face sheet 30 and the septum layer 20a. The acoustic apertures 24a of the septum layer 20a allow for the passage of the sound waves from the outer acoustic chambers 28 into acoustic attenuation chambers 22 formed between septum layers 20a and 20b. Again, absorption of sound wave energy is contemplated to occur within the acoustic attenuation chambers 22. The acoustic apertures 24b formed in the septum layer 20b allow further passage of the sound waves into the inner acoustic chambers 34. As the back sheet 36 is depicted to be a solid material the sound waves are trapped or contained within the inner acoustic chambers 34 for further energy absorption and attenuation.

As one of ordinary skill in the art will appreciate, it is contemplated that the efficiency of the acoustic attenuation structure 10 is impacted by the sizing, geometry and configuration of the honeycomb core 12, including the material selection regarding the same. In addition, the number, thickness, spacing, texture, material selection of septum layers 20 disposed within the honeycomb core 12, and the number, diameter sizing and configuration of the acoustic apertures in the various septum barriers 20 will likewise affect the efficiency of acoustic attenuation. Though not shown, it is further contemplated that the honeycomb cells 14 may be filled with acoustic absorbing materials, such as fiberglass, so as to further enhance attenuation.

In another embodiment of the present invention, there is provided an acoustic attenuating structure 10 which is constructed in accordance with the above described method.

It is contemplated that the acoustic attenuating structure 10 may be used to form an acoustic liner to form the surface of a turbine aircraft engine housing.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. An acoustic attenuating structure comprising:

a honeycomb core having a plurality of honeycomb cells; and a plurality of septum layers spaced apart from one another disposed within the honeycomb cells, each of the septum layers having acoustic apertures formed therethrough and an associated ablating wavelength and being transparent to the ablating wavelengths of the other septum layers.

2. The acoustic attenuating structure of claim 1 wherein the acoustic apertures have respective aperture diameters, the diameters of the acoustic apertures of a respective one of the septum layers having the same diameter.

3. The acoustic attenuating structure of claim 2 wherein the aperture diameters associated with a respective one of the septum layers is different than the aperture diameters associated with another respective one of the septum layers.

4. The acoustic attenuating structure of claim 1 wherein the acoustic apertures is disposed in a configuration, the configuration of the acoustic apertures associated with a respective one of the septum layers being different than the configuration of the acoustic apertures associated with another respective one of the septum layers.

5. The acoustic attenuating structure of claim 1 wherein a respective one of the septum layers is formed of a polymeric material which is optically transmissive to a laser beam at the ablating wavelength of at least one other respective one of the septum layers.

6. The acoustic attenuating structure of claim 1 wherein the acoustic apertures have respective aperture diameters which are less than six millimeters.

7. The acoustic attenuating structure of claim 1 wherein the acoustic apertures of a respective one of the septums layers is sized and configured such that the respective one of the septum layers having at least a one percent open area.

8. The acoustic attenuating structure of claim 1 wherein the honeycomb core have generally planer opposing sides and the acoustic attenuating structure further comprising a porous face sheet attached to the honeycomb core adjacent a respective one of the opposing sides of the honeycomb core.

9. The acoustic attenuating structure of claim 1 wherein the septum layers are formed of a polymeric material.

10. The acoustic attenuating structure of claim 9 wherein the polymeric material chosen from the group consisting of poly(methyl methacrylate), polystyrene, polyimide and nitrocellulose.

11. The acoustic attenuating structure of claim 9 wherein the polymeric material is doped with a chromophore to alter the optical characteristics of the polymeric material at a predetermined laser wavelength.

12. The acoustic attenuating structure of claim 11 wherein the chromophore is chosen from the group consisting of benzoin, anthracene, rhodamine, stilbene and diphenyltriazene.

13. The acoustic attenuating structure of claim 1 wherein the plurality of septum layers comprises two septum layers.

14. The acoustic attenuating structure of claim 1 wherein said structure forms an turbo aircraft engine housing.

* * * * *